US007011320B1

(12) United States Patent
Gomez

(10) Patent No.: US 7,011,320 B1
(45) Date of Patent: Mar. 14, 2006

(54) MOTORCYCLE CARRIAGE

(76) Inventor: Ramon Gomez, 350 Keap St., apt. 3C, Brooklyn, NY (US) 11211

( * ) Notice: Subject to any disclaimer, the term of this patent is extended or adjusted under 35 U.S.C. 154(b) by 0 days.

(21) Appl. No.: 11/058,588

(22) Filed: Feb. 14, 2005

(51) Int. Cl.
*B62D 63/06* (2006.01)

(52) U.S. Cl. ....................................... 280/204; 280/486

(58) Field of Classification Search ................ 280/407, 280/483, 204, 202, 292, 503, 486, 288.4; 224/413, 518, 519, 419, 422
See application file for complete search history.

(56) References Cited

U.S. PATENT DOCUMENTS

| | | | | |
|---|---|---|---|---|
| 254,968 A | * | 3/1882 | Moore et al. | 34/174 |
| 609,857 A | * | 8/1898 | West | 280/204 |
| 1,311,816 A | | 7/1919 | Heintz. | |
| 1,613,945 A | | 1/1927 | Fox | |
| 1,633,086 A | | 6/1927 | Fox | |
| 1,736,433 A | * | 11/1929 | Fogger | 280/416 |
| 3,734,536 A | | 5/1973 | Dever et al. | |
| 3,887,208 A | | 6/1975 | Vidal | |
| 4,027,899 A | | 6/1977 | Hawes et al. | |
| 4,511,155 A | * | 4/1985 | Galloway | 280/204 |
| 4,685,691 A | | 8/1987 | Tremblay | |
| 6,042,138 A | | 3/2000 | Shreck | |

FOREIGN PATENT DOCUMENTS

| | | |
|---|---|---|
| CA | 2.287.827 | 5/2000 |
| GB | 228.791 | 2/1925 |
| GB | 422.768 | 2/1934 |

* cited by examiner

*Primary Examiner*—Lesley D. Morris
*Assistant Examiner*—Michael T. Nguyen
(74) *Attorney, Agent, or Firm*—Michael I. Kroll

(57) ABSTRACT

Apparatus 10 discloses a motorcycle 12 carriage 14 used for passenger transport. The motorcycle carriage 14 is comprised of an open carriage mounted to a frame having wheels thereunder with the frame extending to a coupling member mountable to a motorcycle receiver. In addition, the present invention 10 provides for an additional element in the form of a pivotably fastened extend able and retractable canopy.

13 Claims, 8 Drawing Sheets

MOTORCYCLE CARRIAGE

BACKGROUND OF THE INVENTION

1. Field of the Invention

The present invention relates generally to passenger transport devices and, more specifically, to a motorcycle carriage used for passenger transport. The motorcycle carriage is comprised of an open carriage mounted to a frame having wheels thereunder with the frame extending to a coupling member mountable to a motorcycle receiver.

In addition, the present invention provides for an additional element in the form of a pivotally fastened extendable and retractable canopy.

2. Description of the Prior Art

There are other transport devices designed for passengers. Typical of these is U.S. Pat. No. 609,857 issued to West on Aug. 30, 1898.

Another patent was issued to Heintz on Jul. 29, 1919 as U.S. Pat. No. 1,311,816. Yet another U.S. Pat. No. 1,613,945 was issued to Fox on Jan. 11, 1927 and still yet another was issued on Jun. 21, 1927 to Fox as U.S. Pat. No. 1,633,086.

Another patent was issued to Dever, et al. on May 22, 1973 as U.S. Pat. No. 3,734,536. Yet another U.S. Pat. No. 3,887,208 was issued to Vidal on Jun. 3, 1975. Another was issued to Hawes et al. on Jun. 7, 1977 as U.S. Pat. No. 4,027,899 and still yet another was issued on Apr. 16, 1985 to Galloway as U.S. Pat. No. 4,511,155.

Another patent was issued to Tremblay on Aug. 11, 1987 as U.S. Pat. No. 4,685,691. Yet another U.S. Pat. No. 6,042,138 was issued to Shreck on Mar. 28, 2000. Still another U.K. Patent No. GB228,791 was issued to Heimgartner on Feb. 12, 1925. Another was issued to A/S gyro, Jernstoberi, Maskinfabrik on Jan. 17, 1935 as U.K. Patent No. GB422,768 and still yet another was issued on May 2, 2000 to Jobidon as Canadian Patent No. CA2287827.

U.S. Pat. No. 609,857

Inventor: Edward M. West

Issued: Aug. 30, 1898

In a bicycle attachment, the combination of a two-wheel vehicle having a frame consisting of a transverse tube, the ends of which are bent so as to form half-loops extending upward and at right angles thereto, of horizontal loops secured at right angles to the half-loop, of a lug formed upon one end of the said loops, the said lug adapted to support a detachable arm, the said arm having a connecting-link, of wheels mounted within the said loops and half-loop, substantially as shown and described.

U.S. Pat. No. 1,311,816

Inventor: Otto L. Heintz

Issued: Jul. 29, 1919

A vehicle, attachment for motor and other cycles comprising a wheeled frame, and flexible means for connecting said frame at its front end with a motor cycle and constructed to permit free vertical movement of said wheeled frame and the motor cycle relatively to each other but holding said members against horizontal lateral movement relatively to each other.

U.S. Pat. No. 1,613,945

Inventor: Werner J. Fox

Issued: Jan. 11, 1927

In a device for attaching—the forward ruches of a trailer to a motorcycle, opposite sections each comprising a pair of bars, one of which extends rearwardly in a horizontal plane from a ball and socket connection with—the forward reach of the trailer and vertically at an angle rearwardly to its pivotal Mounting upon the rear end of the motorcycle, the other bar extending from the ball and socket connection to a pivotal mounting in a support attached to the motorcycle, an eccentric arm extending rearwardly from the second bar, and a connecting link pivoted to said arms of the opposite sections rearwardly of the motorcycle rear wheel.

U.S. Pat. No. 1,633,086

Inventor: Werner J. Fox

Issued: Jun. 21, 1927

In a device of the class described, the combination of inclined posts, outwardly and forwardly directed members having their timer ends pivoted to opposite ends of said posts, ball and socket joints at the outer ends of the members, and a link connecting the ball and socket joints.

U.S. Pat. No. 3,734,536

Inventor: James A. Dever, et al.

Issued: May 22, 1973

A formed tow bar for trailering utility carts behind two-wheel cycles adapted to be operatively attached to the lowermost cycle frame member disposed below the axis of the wheels and forward of the rear cycle wheel and further adapted to be secured to the utility trailer whereby the formed two-bar is maintained substantially horizontal to the ground during trailering.

U.S. Pat. No. 3,887,208

Inventor: Paul Vidal

Issued: Jun. 3, 1975

A collapsible, portable, hand-pullable two-wheeled utility cart adaptable to selectively transport small children or various baggage, luggage, shopping bags, and the like. The adjustable drawbar is provided with an adjustable extensible, swivel-type handle to reduce fatigue on the wrist and/or arm of the person pulling the cart, and is further provided with an articulated at-rest supporting leg serving also as an adjustable child's foot rest selectively pivotally foldable at two places. Additional features include adjustable hand grips for the child passenger; auxiliary hand pulls attachable to the drawbar to enable two persons to pull the cart; and extensible step-traversing roller mechanism to ease the cart down steps with less jolting; a luggage-stabilizing and supporting bracket removably attachable to the cart frame and drawbar; elastic tiedown cords for the baggage; and a universal type swivel adapter and bracket attachment to enable the cart to be towed by a bicycle or auto-type vehicle. The cart is compactly collapsible to facilitate both brief and extended travel by car, train, plane or bus without inconvenience to the owner or fellow travelers.

U.S. Pat. No. 4,027,899

Inventor: Edward L. Hawes

Issued: Jun. 7, 1977

A trailer for a motorcycle including a hitch formed of two parallel flat plates attached to the trailer by a hinge having a transversely disposed horizontal axis. Another flat plate is sandwiched between the two parallel plates and the plates are fastened together by a pin inserted through holes in the plates to form a hinge having a vertical axis. Tubular members are mounted to the motorcycle and receive extensions adjustably mounted to the inner flat plate to thereby attach the trailer to the motorcycle. The trailer also has a resilient suspension system for the trailer road wheel which is adjustable to compensate for various loads carried on the trailer and is formed in a manner such that wind acting on the top of the trailer acts to urge the trailer downwardly to thus stabilize the trailer when in use.

U.S. Pat. No. 4,511,155

Inventor: Donald Galloway

Issued: Apr. 16, 1985

A one-wheel trailer for a two-wheeled vehicle such as a motorcycle, or the like, is disclosed. The trailer includes a first and a second arm, each arm having a first and a second end. The first end of each arm is connected preferably to the site corresponding to a passenger foot peg of the two wheeled vehicle or the like. A rigid frame is secured adjacent the second end of each arm. A container is secured to the bulkhead and a spring biased suspension arm is pivotally connected to the bulkhead. A castor arm is mounted adjacent the distal end of the suspension arm enabling swiveling of the castor arm relative to the suspension arm. A wheel is rotatably mounted relative to the castor arm permitting the wheel to support the container.

U.S. Pat. No. 4,685,691

Inventor: Ronaldo Tremblay

Issued: Aug. 11, 1987

This trailer comprises a U-shape load-carrying casing with a hitching bar across the free ends of the legs of the casing. The center of said cross-bar is hitched to the vehicle between the two wheels thereof by means of a universal joint hitch. The load carrying casing extends on both sides of the vehicle and across the back thereof. Two wheels support the back of the casing. The universal hitch enables the vehicle, such as a motorcycle, to roll, rotate or pitch relative to the trailer, such as when taking curves and/or riding on bumpy roads of grade and down-grade. The hitch is positioned below the horizontal plane passing through the vehicle axles and in front of the center of gravity of the vehicle. The trailer and vehicle assembly is very stable both while riding and braking. Also, the portions of the casing extending on both sides of the vehicle constitute a protection for the vehicle rider and passenger.

U.S. Pat. No. 6,042,138

Inventor: Richard D. Shreck

Issued: Mar. 28, 2000

A motorcycle trailer apparatus includes an elongated frame having first and second end portions, the first end portion carrying a detachable hitch for attaching the frame to the rear of a motorcycle. An arm assembly is pivotally attached to the frame at the second end portion. A single wheel is carried by the arm assembly. A shock absorber extends between the frame and the arm assembly at an inclined portion of the arm assembly. The shock absorber is inclined with its rear end portion being higher than the front end portion to provide an improved geometry for the combination of frame, arm assembly, shock absorber and wheel.

U.K. Patent Number GB228,791

Inventor: Josef Heimgartner

Issued: Feb. 12, 1925

Relates to a universal coupling between a two-wheeled trailer and a bicycle which may be provided with means for preventing rotational movement, when required, so that the trailer may hold the bicycle vertical. The trailer is constructed with two forwardly extending rods, the front ends of which are secured in a vertical plate. A fork is pivoted on the one hand to the plate by a bolt and on the other hand by a, pin to a clip secured on the saddle pillar of the bicycle. An upward projection from the plate carries a hinged latch which is adapted to engage a notch in a similar upward projection from the fork to prevent rotational movements. To permit slacking back of the pin it is formed with a groove in which engages a pivoted latch which is normally held down by a spring.

U.K. Patent Number GB422,768

Inventor: A/S Gyro, Skive Jernstoberi, et al.

Issued: Jan. 17, 1935

A single-wheeled trailer for cycles is provided at its rear end with the single wheel and comprises a frame, the centre of gravity of which is below the axis of the wheel and is provided with a post for connection to the cycle above the cycle wheel. The trailer comprises a frame connected at the front by curved members to the cycle at a point situated in front of the vertical plane of the axis by means of a universal joint and provided at the rear with a fork in which is mounted a single wheel. The frame is provided with a body or platform for goods or passengers.

Canadian Patent Number CA 2287827

Inventor: Richard Jobidon

Issued: May 2, 2000

There is provided a human propelled vehicle having a front cart portion and a rear cycle portion, the rear cycle portion comprising a frame having a single wheel mounted thereon, and a seat, pedals being operatively connected to drive the wheel in a conventional bicycle arrangement, the front cart portion having a plurality of ground contact members such as wheels, a seat or the like for a passenger, a steering assembly to steer the ground contact members and connecting means connecting the rear cycle portion and front cart portion which permit the rotational movement the rear cycle portion and the front cart portion and also a tilting motion for the rear cycle portion.

While these transport devices may be suitable for the purposes for which they were designed, they would not be as suitable for the purposes of the present invention, as hereinafter described.

SUMMARY OF THE PRESENT INVENTION

The present invention discloses a motorcycle carriage used for passenger transport. The motorcycle carriage is comprised of an open carriage mounted to a frame having wheels thereunder with the frame extending to a coupling member mountable to a motorcycle receiver. In addition, the present invention provides for an additional element in the form of a pivotably fastened extend able and retractable canopy.

A primary object of the present invention is to provide a passenger transport vehicle attachable to a motorcycle.

Another object of the present invention is to provide a passenger transport vehicle having an open carriage.

Yet another object of the present invention is to provide a passenger transport vehicle having a frame extending to a coupling.

Still yet another object of the present invention is to provide a passenger transport vehicle wherein said coupling is mountable to a motorcycle receiver mount.

Another object of the present invention is to provide a passenger transport vehicle having a canopy pivotally fastened to the carriage.

Yet another object of the present invention is to provide a passenger transport vehicle incorporating a braking assembly actuateable from the motorcycle.

Still yet another object of the present invention is to provide a passenger transport vehicle having indicator and warning lights positioned on the rear of the carriage in communication with the motorcycle lighting system.

Additional objects of the present invention will appear as the description proceeds.

The present invention overcomes the shortcomings of the prior art by providing a motorcycle carriage used for passenger transport. The motorcycle carriage is comprised of an open carriage mounted to a frame having wheels thereunder with the frame extending to a coupling member mountable to a motorcycle receiver with an extendable retractable canopy fastened to the carriage.

The foregoing and other objects and advantages will appear from the description to follow. In the description reference is made to the accompanying drawings, which form a part hereof, and in which is shown by way of illustration-specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
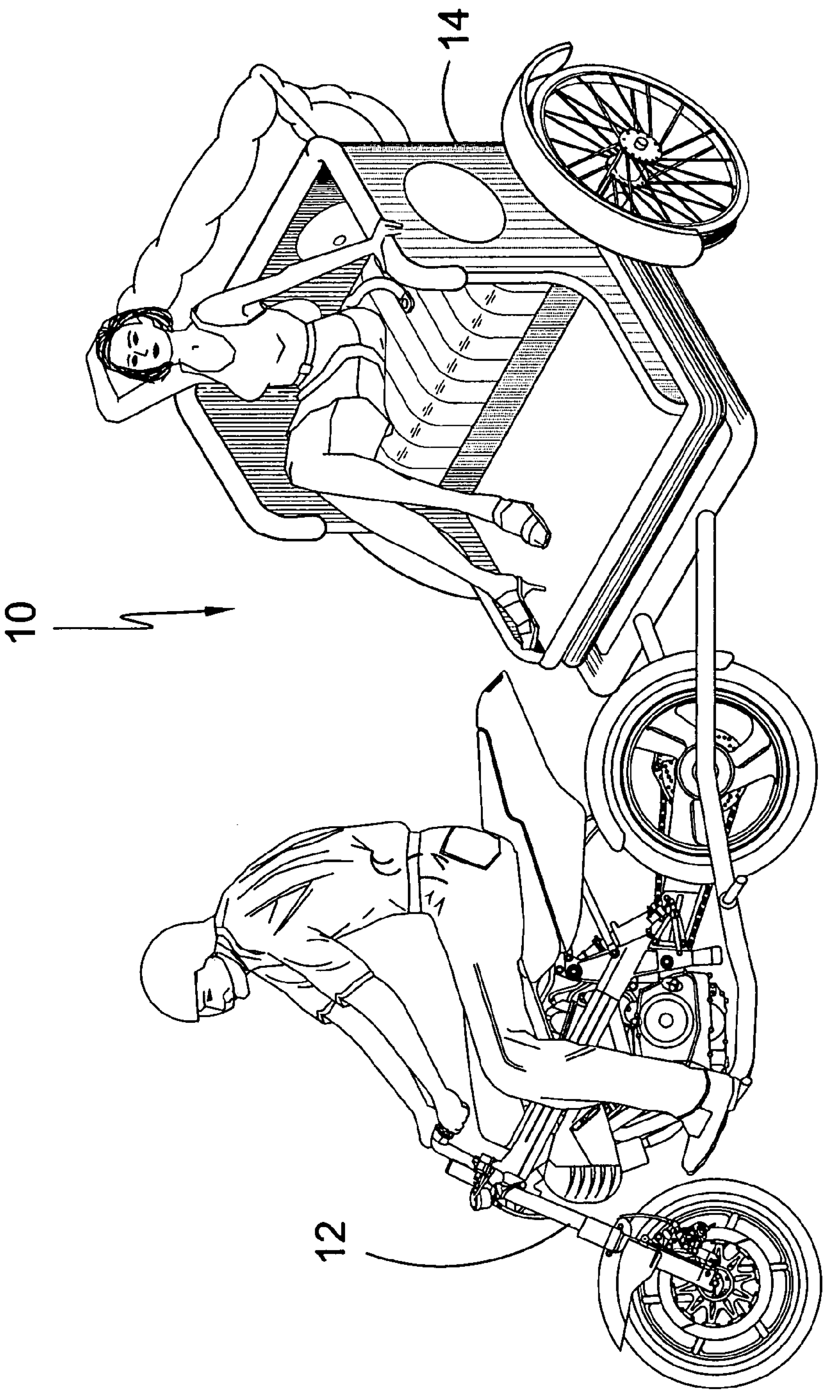
FIG. 1 is an illustrative view of the present invention in use.

With to reference numerals used, the following numbering is used throughout the drawings.

10 present invention
12 motorcycle
14 carriage
16 frame of motorcycle
18 rear wheel
20 tow bar
22 compression spring
24 securing bolts
26 top cover
28 safety belts
30 turn indicator
32 foot rest
34 brake light
36 tail light
38 extra brake light

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments since practitioners skilled in the art will recognize numerous other embodiments as well. For a definition of the complete scope of the invention, the reader is directed to the appended claims.

Turning to FIG. 1, shown therein is an illustrative view of the present invention 10 in use. The present invention 10 discloses a multiple passenger motorcycle 12 attachment or carriage 14 that is connected to a motorcycle frame. The attachment's advantage is the arrangement of the connections which are such as to effect the center of gravity of the motorcycle 12 and carriage 14 as to practically eliminate the overturning of the motorcycle or carriage on a curve or turn. The motorcycle hitch is fixedly attached to the frame of the motorcycle 12, protruding outward from both sides and extending to and past the rear wheel of the motorcycle, forming the attachment.

Figure 2:
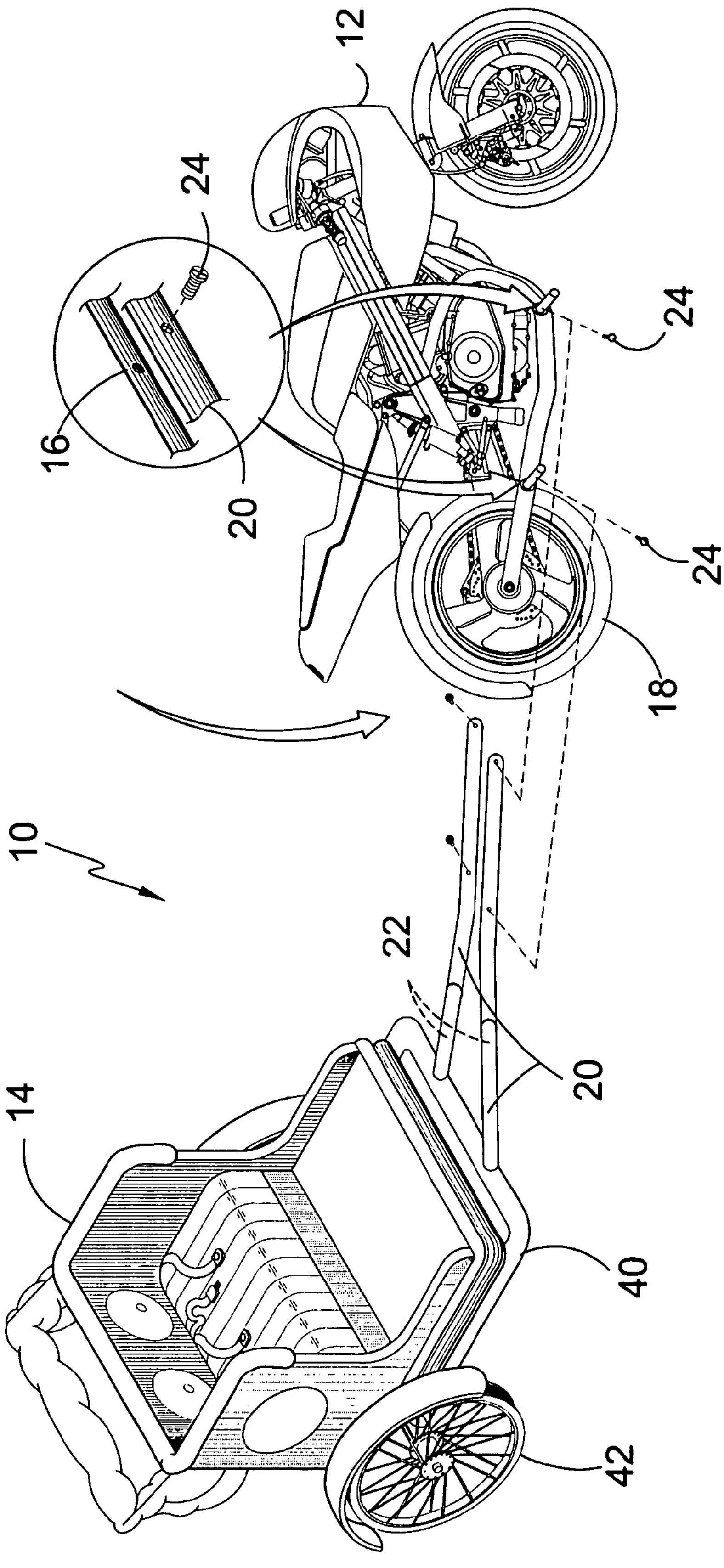
FIG. 2 is a perspective view of the present invention disconnected.

Turning to FIG. 2, shown therein is a perspective view of the present invention 10 disconnected. Shown is a perspective view of the present invention 10 disclosing a multiple passenger motorcycle attachment or carriage 14 that connects to a motorcycle frame 16 by means of attachment members. The motorcycle hitch is fixedly attached to the frame 16 of the motorcycle 12, protruding outward from both sides and extending to and past the rear wheel 18 of the motorcycle, forming the connection. Also shown are the right and left carriage arms or tow bars 20, each having compression springs 22 therein to allow the carriage 14 to turn behind the motorcycle 12 and multiple securing bolts 24 connecting to and parallel to the frame 16 of motorcycle 12. The frame 40 and wheel 42 of the carriage 14 is also shown.

Figure 3:
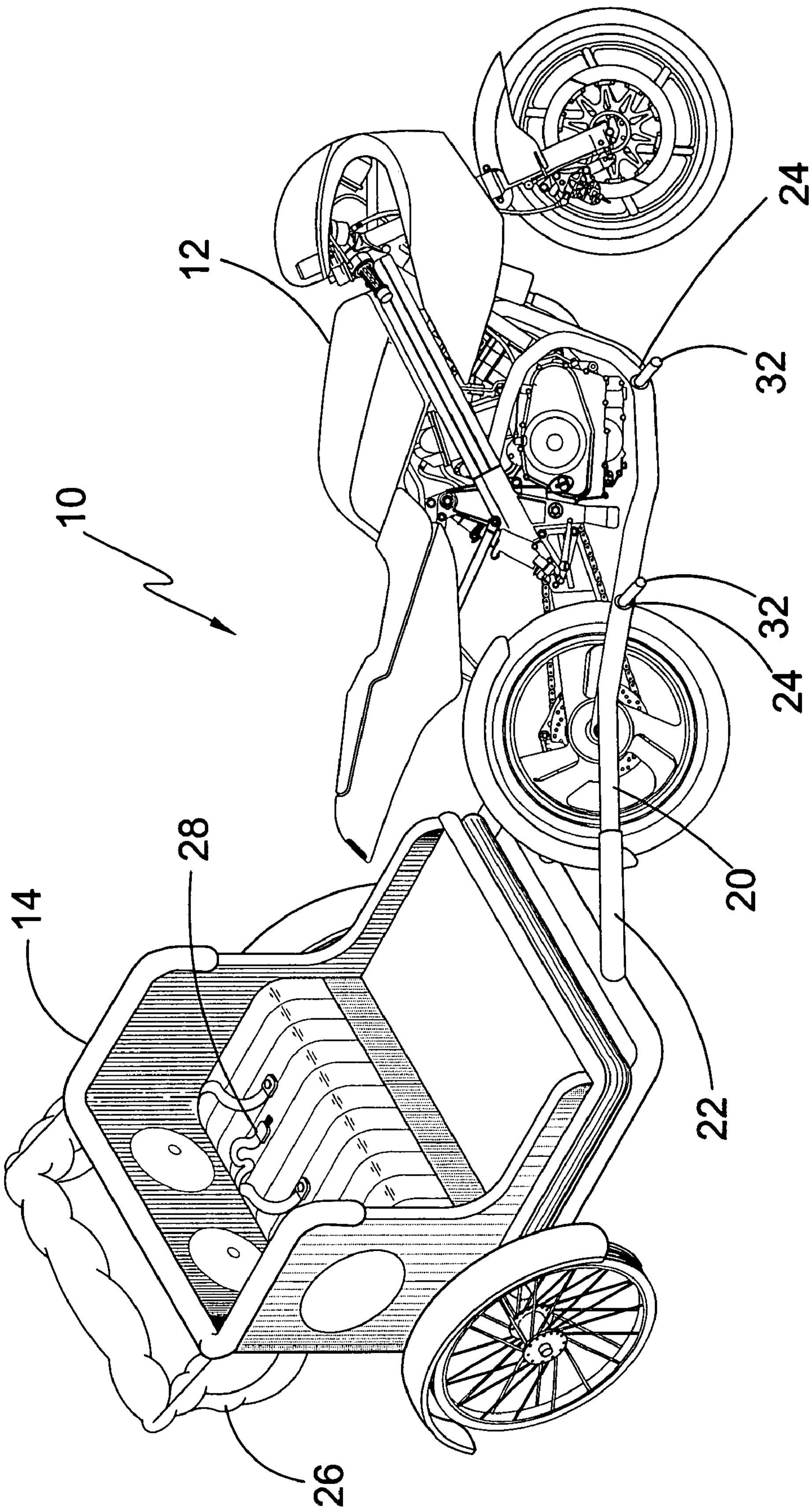
FIG. 3 is a perspective view of the present invention connected.

Turning to FIG. 3, shown therein is a perspective view of the present invention 10, a multiple passenger motorcycle carriage 14 that is connected to a motorcycle 12 frame by means of attachment members or tow bars 20. The motorcycle hitch is fixedly attached to the frame of the motorcycle 12, protruding outward from both sides and extending to and past the rear wheel of the motorcycle, forming the connection. Also shown are top cover 26, safety belts 28, compression springs 22, front and rear securing bolts 24 and foot rests 32 in co-alignment therewith.

Figure 4:
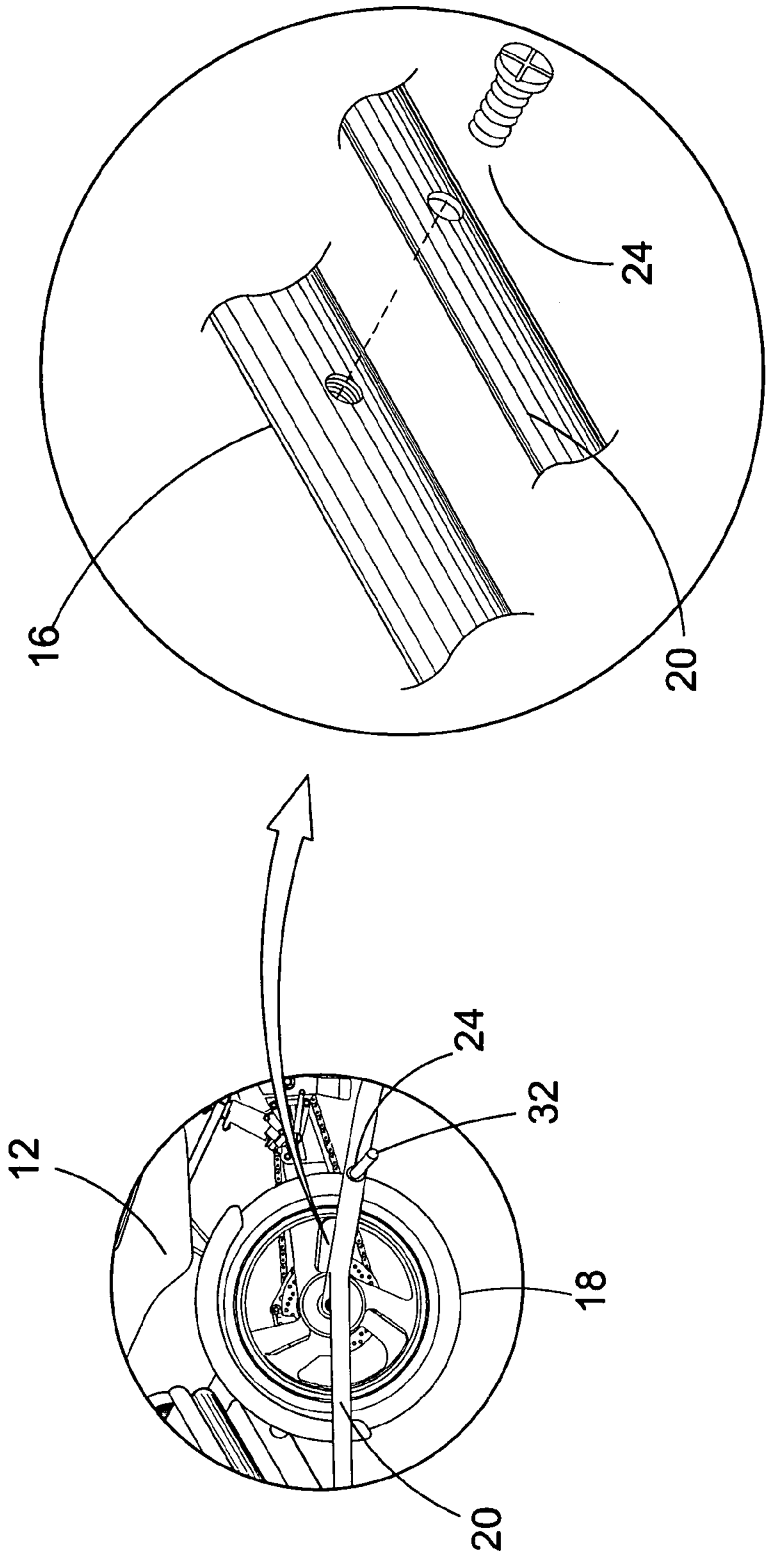
FIG. 4 is a sectional view of the ball and hitch connecting members of the present invention connected.

Turning to FIG. 4, shown therein is a detailed view of the present invention 10 in a connected position. The device, a multiple passenger motorcycle carriage that is connected to a motorcycle frame 16, protruding outward from both sides and extending to and past the rear wheel 18 of the motorcycle 12. Also shown are the carriage tow bar 20, securing bolts 24 and foot rest 32.

Figure 5:
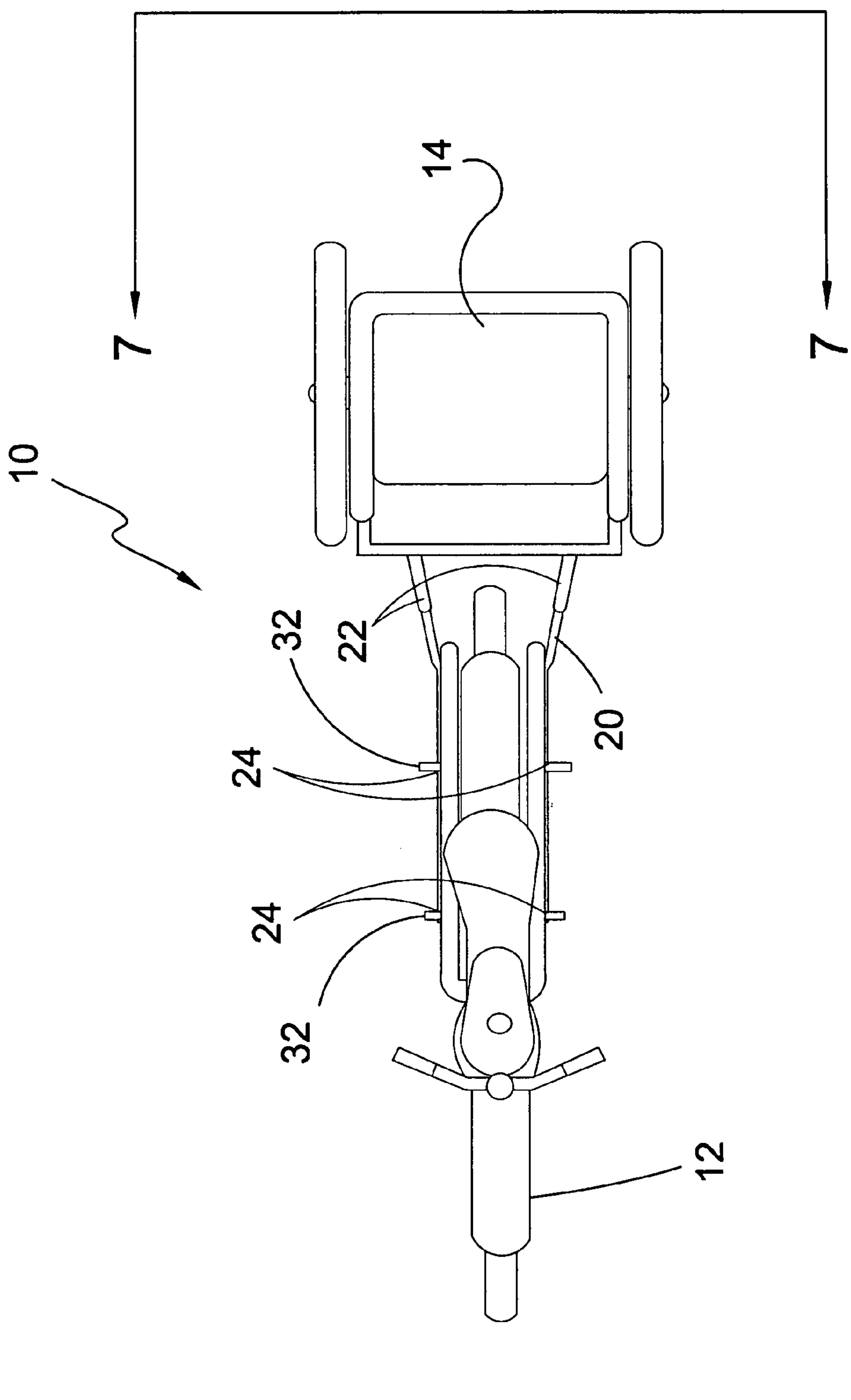
FIG. 5 is a top view of the present invention connected.

Turning to FIG. 5, shown therein is a top view of the present invention 10 in a connected position. The device is a multiple passenger motorcycle 12 carriage 14 that is connected to a motorcycle frame by means of attachment members. The motorcycle hitch is fixedly attached to the frame of the motorcycle 12, protruding outward from both sides and extending to and past the rear wheel of the motorcycle. Also shown are the front and rear foot rests 32, securing bolts 24, tow bar 20 and spring 22.

Figure 6:
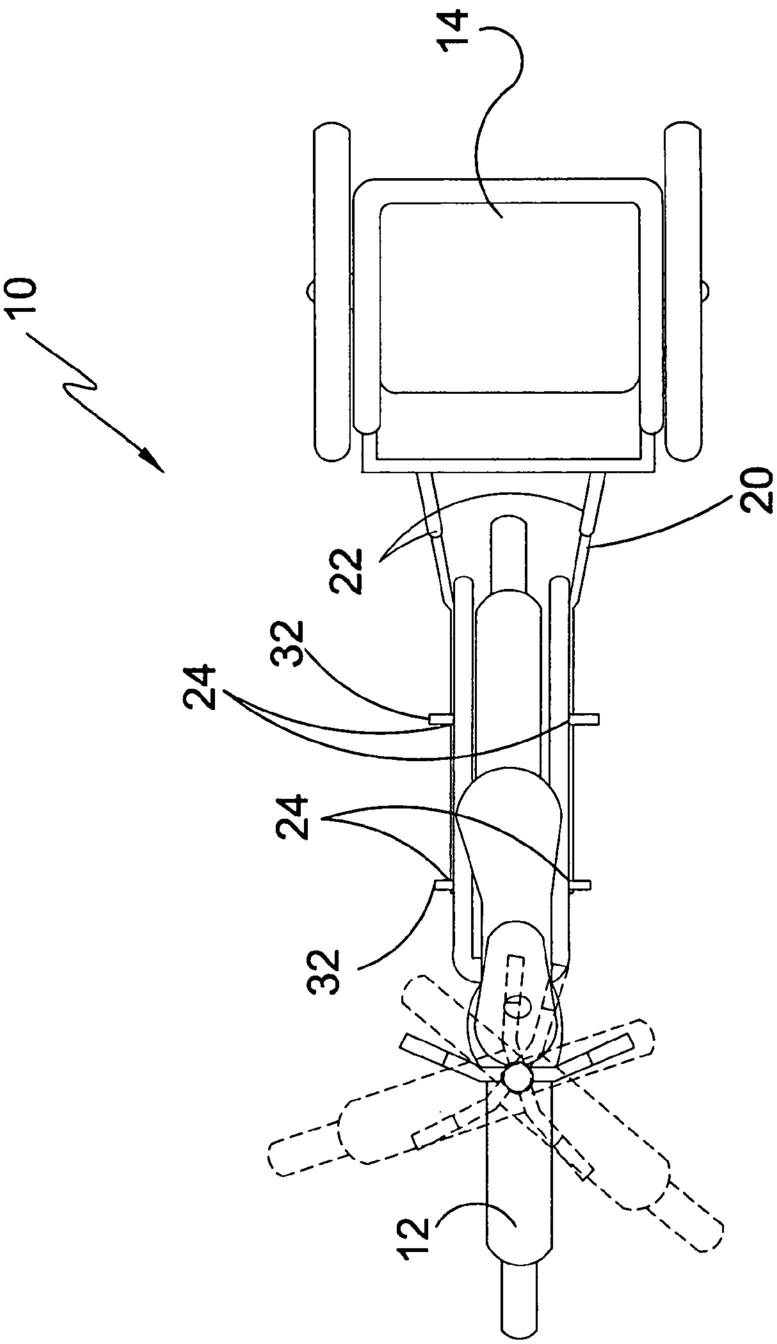
FIG. 6 is a top view of the present invention connected.

Turning to FIG. 6, shown therein is a top view of the present invention 10 in a connected position. The device is a multiple passenger motorcycle 12 carriage 14 that is connected to a motorcycle frame by means of attachment members. The motorcycle hitch is fixedly attached to the frame of the motorcycle 12, protruding outward from both sides and extending to and past the rear wheel of the motorcycle. Also shown are the front and rear foot rests 32, securing bolts 24, tow bar 20 and spring 22.

Figure 7:
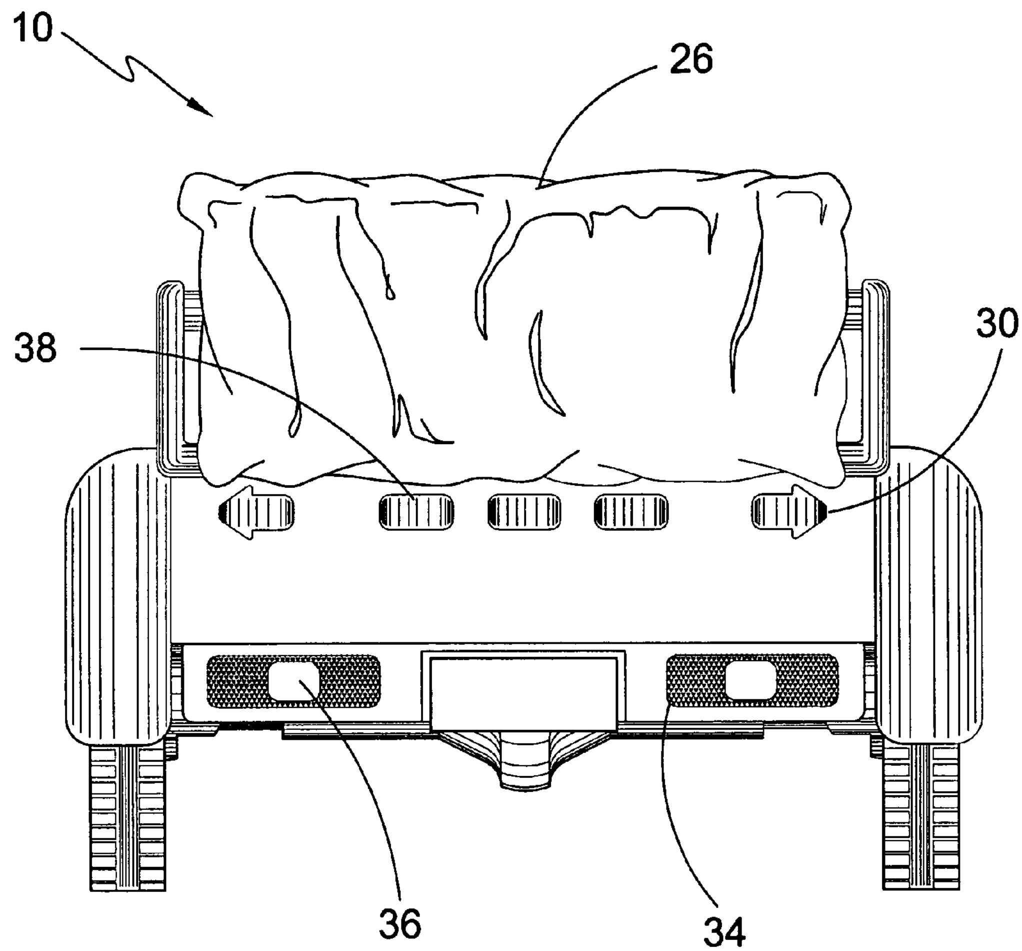
FIG. 7 is a section view of the present invention.

Turning to FIG. 7, shown therein is a section view of the present invention taken 10 from FIG. 5. Shown is a section view of the rear of the present invention 10. Shown are the turning signal indicators 30, the braking signals 34 with tail lights 36 and an additional set of braking signals 38. Also shown is the relation between these signals as they relate to the present invention 10. These signals and indicators are to be deemed functional to national Department of Motor Vehicles Standards for operation of passenger transportation. Also shown is the extendable/retractable canopy 26.

Figure 8:
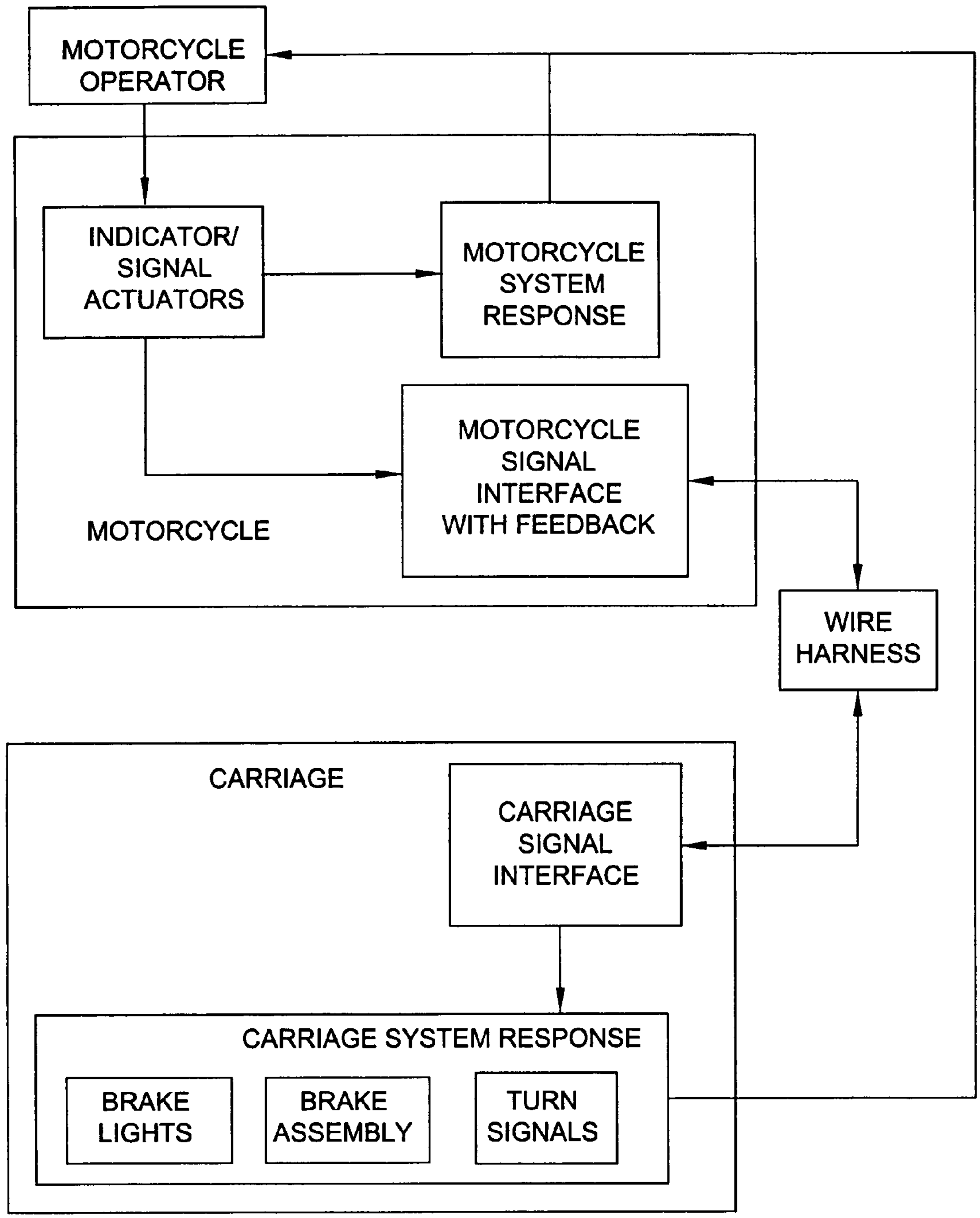
FIG. 8 is a flow diagram of the carriage signal response system.

Turning to FIG. 8, shown therein is a schematic diagram of the carriage signal response system. Shown is a schematic diagram depicting the flow of data from the motorcycle operator to the signals and brakes of the present invention. Shown is an electrical relay path as it is initiated by the motorcycle operator. The system is equipped with a feedback system, which will simultaneously activate any of the carriages systems the motorcycle operator actuates at the motorcycle level, i.e., if the left indicator on the motorcycle is actuated then like wise the left indicator of the present invention will be actuated in unison.

I claim:

1. An apparatus for transporting passengers for connection to a motorcycle, comprising:

a) a carriage for transporting a plurality of passengers, said carriage having a top, bottom, front, rear and first and second sides, wherein said carriage can be removably connected to the rear of the motorcycle so that the carriage can be towed;

b) a first and second arm, each said arm having a first and second end, said first end of said first and second arm being disposed on said front of said first and second sides of said carriage, said second end of said first and second arm being disposed on opposite sides of the motorcycle to permit the carriage to be towed by the motorcycle; and, c) a compression spring being disposed on said first end of each said first and second arm so that said carriage can turn behind the motorcycle.

2. The apparatus of claim 1, said carriage further comprising a frame disposed on said bottom of said carriage, at least one wheel being disposed under said frame so that said carriage can roll on a surface.

3. The apparatus of claim 2, further comprising a canopy being disposed on said top of said carriage.

4. The apparatus of claim 3, wherein said canopy can be raised to a first position and lowered to a second position.

5. The apparatus of claim 4, further comprising passenger safety belts being disposed in said carriage.

6. The apparatus of claim 5, further comprising left and right turn indicators being disposed on said rear of said carriage, wherein said indicators work in unison with the turn indicators of the motorcycle.

7. The apparatus of claim 6, further comprising brake lights being disposed on said rear of said carriage, wherein said brake lights work in unison with the brake lights of the motorcycle.

8. The apparatus of claim 7, further comprising at least one extra brake light being disposed on said rear of said carriage, wherein said extra brake light work in unison with the brake lights of the motorcycle.

9. The apparatus of claim 8, further comprising tail lights being disposed on said rear of said carriage, wherein said tail lights work in unison with the tail lights of the motorcycle.

10. The apparatus of claim 9, wherein said first and second arms are connected to the frame of the motorcycle using securing bolts.

11. The apparatus of claim 10, wherein said second ends of each said first and second arms are disposed substantially parallel to the frame of the motorcycle between the front and rear wheels of the motorcycle.

12. The apparatus of claim 11, further comprising first and second securing bolts being disposed in each of said second ends of said first and second arms so that said second bolt is disposed adjacent said second end of each arm and said first bolt is disposed between said first and second ends of each arm.

13. The apparatus of claim 12, further comprising a first and second foot rest being disposed in co-alignment with said first and second securing bolts, respectively, on opposite sides of the motorcycle.

* * * * *